July 20, 1965                A. HALLSWORTH                3,195,913
               ROTATABLE SEAT AND STEERING COLUMN
                     ARRANGEMENT FOR VEHICLES
Filed Nov. 8, 1962                                     5 Sheets-Sheet 1

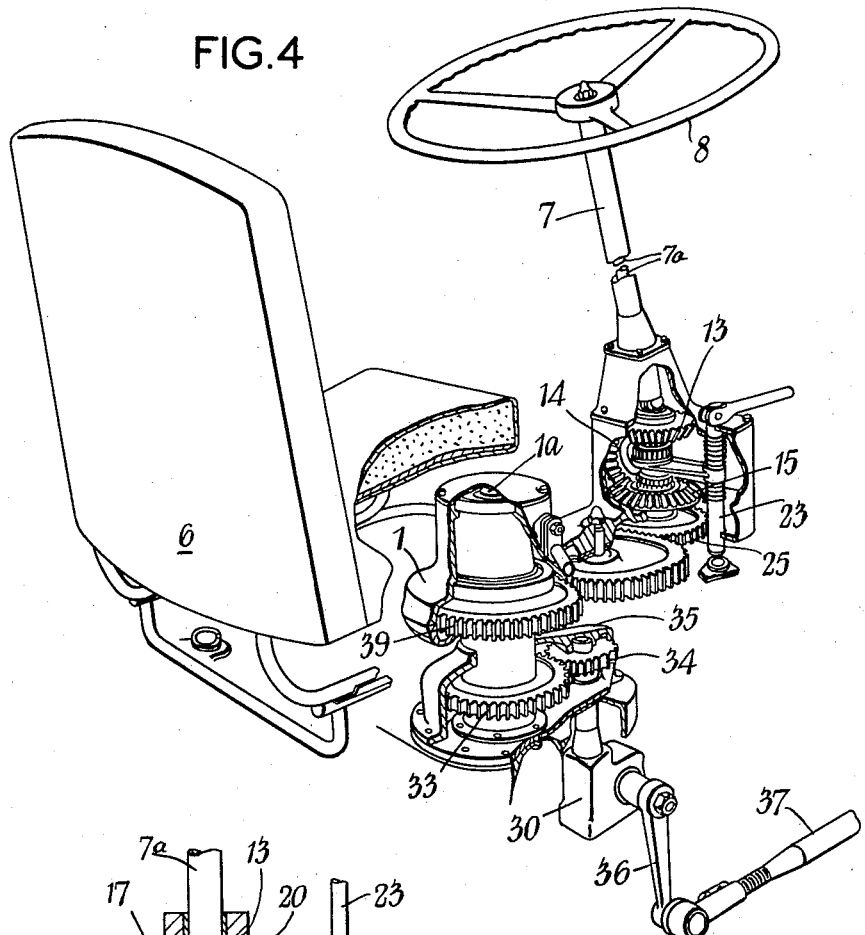

United States Patent Office 3,195,913
Patented July 20, 1965

3,195,913
ROTATABLE SEAT AND STEERING COLUMN
ARRANGEMENT FOR VEHICLES
Arnold Hallsworth, Sunderland, England, assignor to
British Crane & Excavator Corporation Limited
Filed Nov. 8, 1962, Ser. No. 236,386
Claims priority, application Great Britain, Nov. 9, 1961,
40,150/61
8 Claims. (Cl. 280—87)

The present invention relates to vehicles having driving seats which are reversible so as to permit the driver to face in either direction so that he is always looking in the direction of travel.

Examples of such vehicles upon which reversible driving seats are fitted are dumpers and mobile cranes.

An object of the present invention is to provide a simple and robust reversible steering gear in which the steering sense can be changed at the will of the driver.

Broadly the invention comprises a reversible steering gear for wheeled vehicles comprising a steering column and a drive seat mounted opposite to one another and in fixed angular relationship about a vertical axis about which they are adapted to rotate as a single unit, said driving column being in driving engagement with a vertical shaft rotatable about the said vertical axis and in driving connection with a steering box adapted to be mounted upon the chassis of the vehicle and from which the steering of the wheels is effected.

In a preferred embodiment the steering column is connected in driving engagement with the vertical shaft through a reversible gearing which permits the steering sense to be adjusted in accordance with the direction in which the driver of the vehicle faces. This adjustment whilst it may be automatic is preferably under the manual control of the driver.

The invention has particular application to vehicles which in use are usually manoeuvred backwards and forwards or which for various reasons have to run considerable distances in either direction such for example as mobile cranes.

In one embodiment of the invention as applied in particular to mobile cranes two different sets of vehicle control pedals are provided, one set of pedals being for control of the vehicle at high speeds and preferably with front wheel steering and the other set of pedals being with low speed travel and preferably with rear wheel steering in relation to the direction in which the vehicle is moving.

The invention will now be described with reference to the accompanying drawings in which:

FIGURE 3 shows on an enlarged scale the driving connection at the lower end of the steering column;

FIGURE 4 shows an alternative arrangement of drive to the steering box permitting a closer assembly of the steering mechanism to the drop arm and a drive which can be totally enclosed and hence packed with lubricant;

Figure 1:
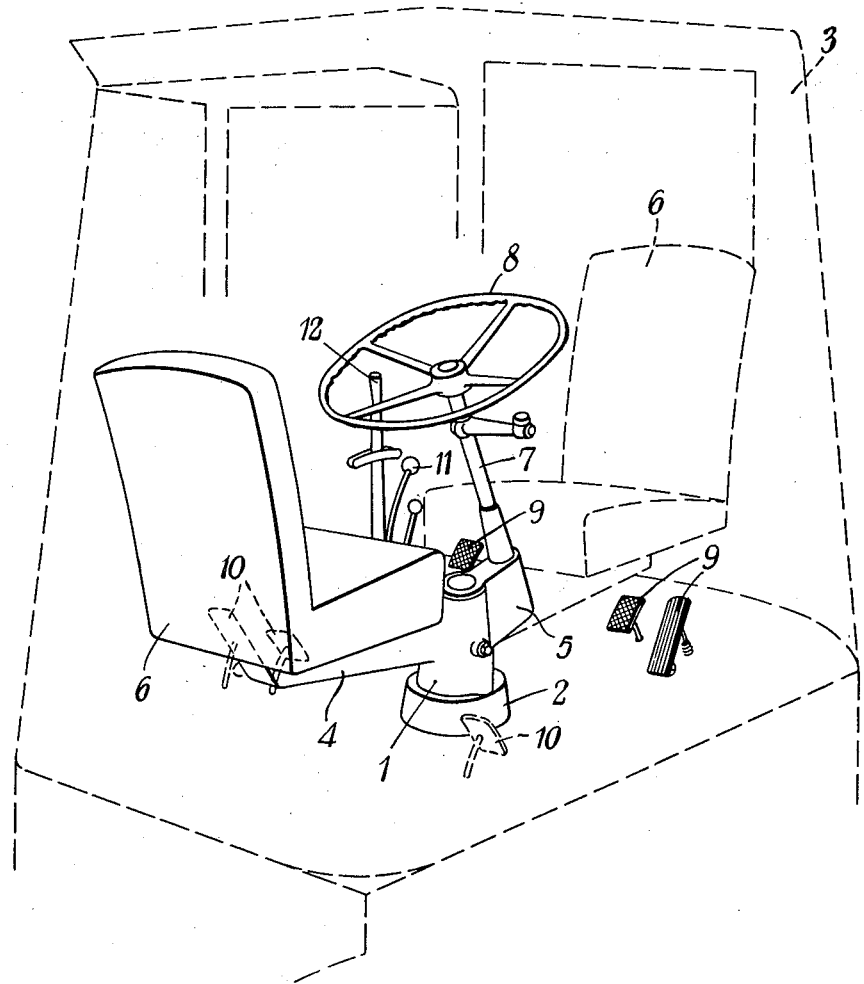
FIGURE 1 shows a perspective view of a driving seat steering wheel and controls arranged in a cab of a mobile crane.

Referring to FIGURE 1, the general lay-out of the driving controls comprises a pivot post 1 mounted for rotation upon a base 2 which is secured to the chassis or floor of the cab 3 of the vehicle. The post 1 carries a pair of diametrically opposed arms 4 and 5. The arm 4 carries the driving seat 6 and the arm 5 carries the steering column 7 carrying the steering shaft 7a at the top of which is mounted the steering wheel 8. In the position shown in full line the seat 6 and steering column 7 are in the position for control of the normal vehicle control pedals 9 with the driver facing forwardly for front wheel steering and high speed travel. In the position of the seat shown in chain line the steering wheel is in the diametrically opposite position to that shown in full line and the vehicle is controlled by pedals 10 for rear wheel steering and slow forward speed. The same gear lever 11 and brake lever 12 are employed in either position falling to the left hand in the forward front wheel steering position and to the right hand in the rearward rear wheel steering position of the controls.

Whilst the two positions of the steering control are shown as being diametrically opposite to one another they may if desired be at any other angle depending upon the design and construction and purpose of the vehicle.

Figure 2:
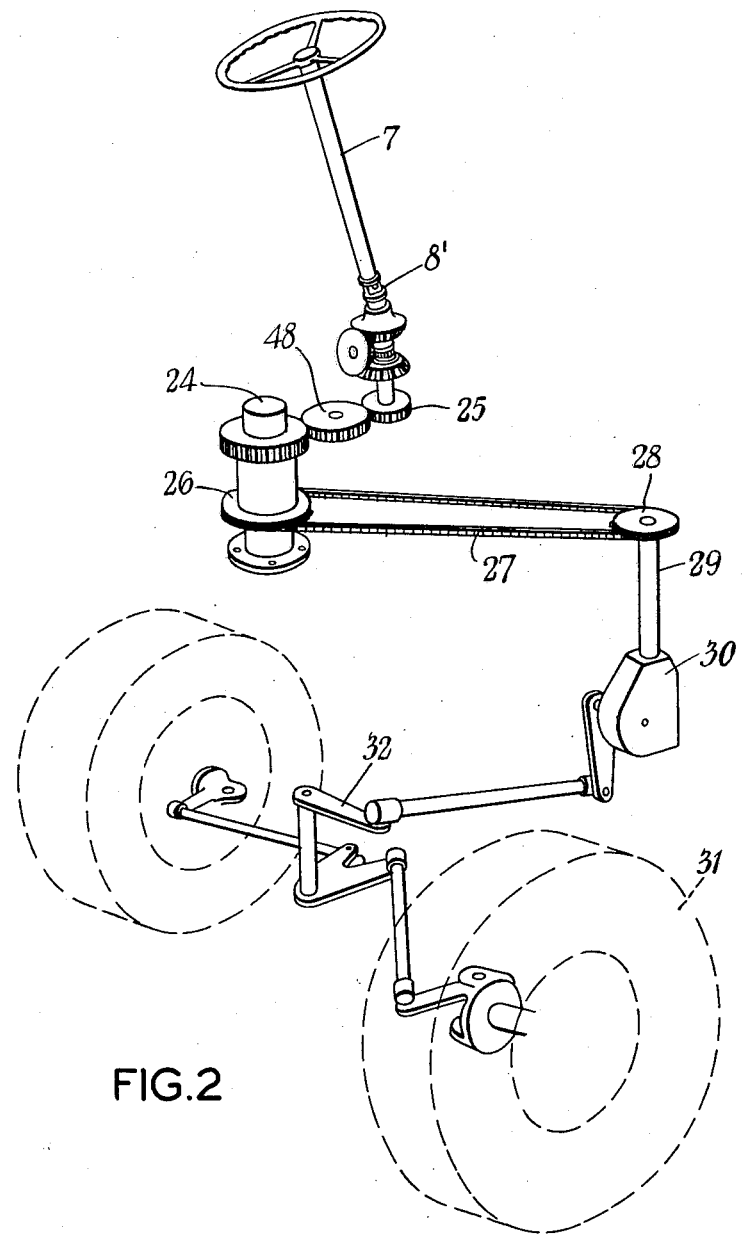
FIGURE 2 shows schematically the driving connection between the steering column and the wheels being steered.

Referring to FIGURES 2 and 3 the steering shaft 7a in column 7 which is angled is connected through a universal joint 8' to a reversible gearing assembly. Referring to FIGURE 3 this assembly comprises a bevel gear 13 which is mounted for free rotation on the steering shaft 7a. The bevel 13 meshes with a freely rotatable bevel gear 14 which can be mounted for free rotation upon a spindle (not shown) mounted fixedly inside the arm 5 which serves as a housing for the reversible gearing assembly. The bevel 14 in turn engages a bevel gear 15 fixed to the shaft 16.

The steering shaft 7a in column 7 extends beyond the bevel 13 and is splined on its lower extended portion to carry a dog clutch 17 which is adapted to slide on the splines but rotates with the steering column. The dog clutch 17 carries sets of teeth 18 and 19 at each end adapted to engage corresponding sets of teeth 20 and 21 respectively. The dog 17 is reciprocated on the splines so that at the upper end of its travel the dog engages the bevel 13 and so locks the bevel 13 to the steering shaft 7a of column 7 and at the lower end of its travel engages the bevel 15 and so locks the steering column to that bevel. It will be apparent that with the dog in the upper position rotation of the steering wheel will rotate the shaft 16 via the bevels 13, 14 and 15 in one direction and with the dog in the lower position rotation of the steering wheel in the same direction will drive the shaft 16 directly to rotate in the opposite direction. The position of the dog is controlled by a selector 22 operated by a rod 23 connected to a suitable operating lever mounted adjacent the steering wheel or other convenient place.

When the dog is in the neutral position i.e. not engaging either of the bevels 13 or 15 the steering column is not in driving connection with the shaft 16 and it is in this position that the dog is located when the driving positions are reversed, i.e. when the seat and steering column are swung about the post 1 from one position to the other.

The shaft 16 drives a vertical shaft 24 through a spur gear 25 and an idler 48 which conveniently can be mounted for free rotation upon a spindle secured to the inside of the arm 5.

The vertical shaft 24 is mounted for rotation in the post 1 about the same vertical axis as about which the seat and steering column rotate and carries at its lower end a chain sprocket 26 which is in driving connection by a chain 27 with a further sprocket 28 keyed to a shaft 29 which serves as the input shaft to the steering box 30. The steering box is connected to the wheels 31 by linkage indicated generally at 32 but can be connected to the wheels 31 by any other suitable linkage.

The construction of gearing consists of a robust assembly of gears and chain and sprocket mechanism which does not involve any reciprocal movement except for the dog 17. Consequently it can be mounted in a minimum of space and once packed with suitable lubricant it rarely requires any service attention.

The seat and steering column may be locked in each position by any convenient means.

Referring to FIGURE 4 the drive from the steering rod 7a of column 7 to the vertical pivot 24 is basically the same. In the construction shown in this figure however the chain and sprocket drive to the steering box is replaced by spur wheels 33 and 34, spur wheel 33 being mounted to rotate with the spur wheel 39. The spur wheel 34 is journalled in the casing 35 which is bolted to a fixed portion of the vehicle. Spur wheel 34 is then operatively connected to the steering box 30 for transmission of the steering via the drop arm 36 to the drag link 37, to the steerable wheels via track rods and the usual connections.

This method of transmitting the drive permits the spurs 33, 34 to be wholly enclosed and to be packed in lubricant to permit long periods of use between maintenance service. Furthermore it enables the steering box to be mounted close to the pivot post 1.

Figure 5:
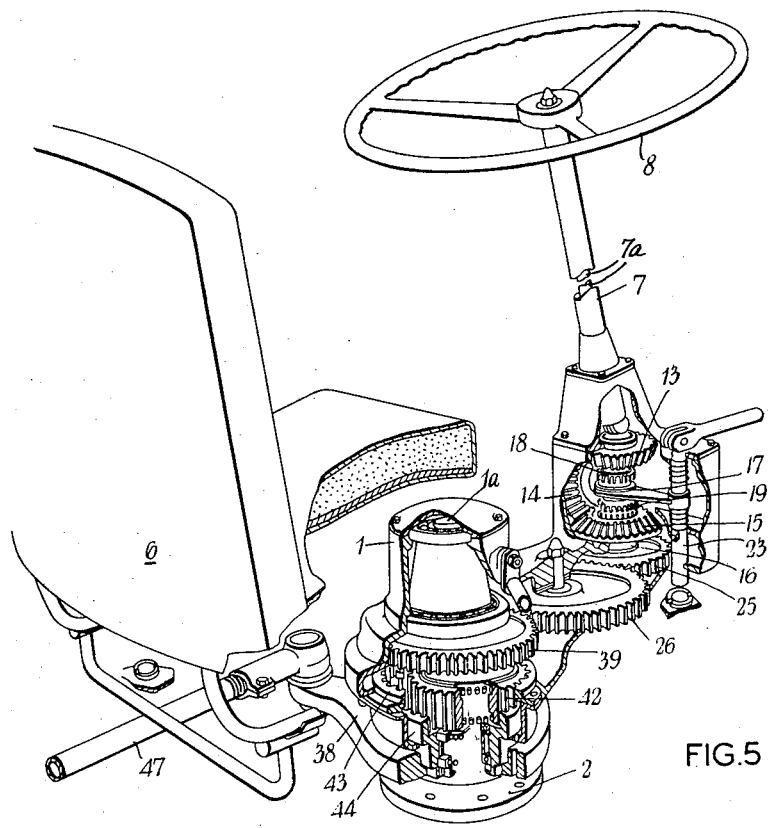
FIGURE 5 shows an arrangement in which the roller type steering box is replaced with a planetary type gearing permitting the steering arm or output lever to rotate coaxially with the axis of rotation of the seat and steering wheel assembly.

FIGURE 5 shows an alternative form of steering box in which the normal cam and follower type of box is replaced by the planetary type of gearing permitting the whole of the output side of the steering mechanism to be mounted coaxially with the pivot post 1 and about the post 1a which is secured to a final portion of the vehicle and carries the pivot post 1 and the gearing of the planetary steering. This arrangement permits the output lever 38 corresponding to the normal drop arm to be mounted to rotate in a horizontal plane coaxially with the pivot post 1 and also permits the steering gearing to be wholly enclosed and packed with lubricant in its casing. Such an arrangement does not require adjustment and gives a long life between maintenance services. In this arrangement the steering drive is transmitted in the same manner as described with reference to FIGURES 1 and 3 to the spur gear 39.

Figure 6:
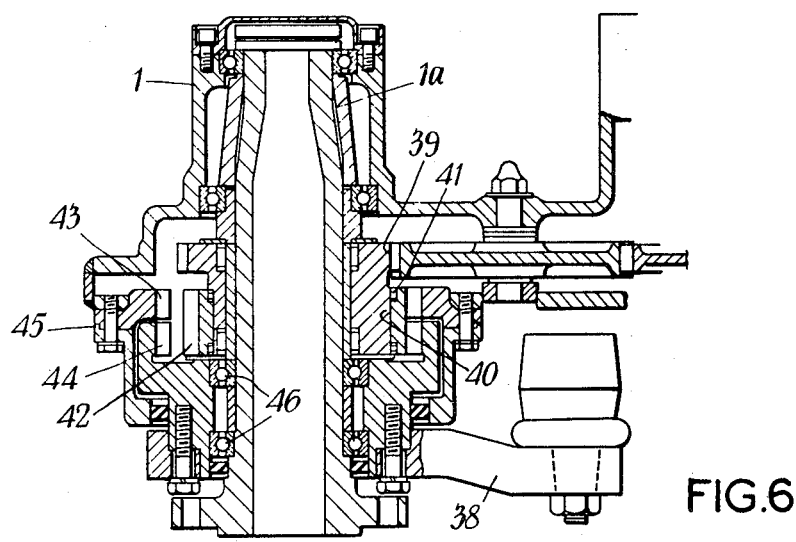
FIGURE 6 shows in vertical section details of the planetary steering.

The spur gear 39 carries below it an eccentric 40 (FIG. 6) upon which is mounted on bearings 41 to rotate freely thereon a planet pinion 42 which due to the eccentric 40 engages over part of their periphery a pair of annulus gears 43 and 44.

The annulus gear 43 is fixed to the casing 45. The annulus gear 44 is mounted on bearings 46 to rotate about the post 1a, and carries in fixed relation the output lever 38. Rotation of the spur 39 by the steering rod 7a in column 7 causes the planetary steering box to operate at the required ratio determined by the gearing of the planet pinion 42 and the two annulus gears 43 and 44 to rotate the lever 38 about the post 1a. The usual connections are then made from the output lever 38 to the steered wheels via the drag link 47.

Naturally the steering can be power assisted in all cases if so required.

In operation of all the embodiments shown the locking pin 23 is operated either to engage the steering column to the bevel 13 or the bevel 15 depending upon the steering sense required or it is freed from connection with the shaft 16 by putting the dog clutch 17 into the neutral position as shown in FIGURE 3. In the neutral position the seat 6 and the steering column 7 is free to rotate about the post 1 to be located in an opposite direction, as described with reference to FIGURE 1.

Conveniently the seat 6 can be tipped up or slid in so that the seating and steering assembly can be rotated in a smaller compass which is frequently necessary in relatively small cabs such as are often provided on mobile cranes.

What I claim is:

1. Reversible steering mechanism for wheeled vehicles comprising a steering shaft and a driving seat mounted oppositely to one another and in fixed angular relationship about a vertical axis about which they are adapted to be rotated as a single unit, a member rotatable about the sid vertical axis and in driving engagement with said steering shaft, a steering box mounted upon the vehicle and adapted to steer the vehicle wheels, said member being in operative engagement with said steering box, reversible gearing disposed between the steering shaft and the rotatable member, and means for disconnecting the drive from the steering shaft to the rotatable member.

2. Reversible steering mechanism as claimed in claim 1 in which the rotatable member serves to operate a chain and sprocket mechanism to impart drive therefrom to the vehicle steering box.

3. Reversible steering mechanism as claimed in claim 1 in which the rotatable member comprises a spur wheel mounted to rotate about a post the axis of which is coincident with the said vertical axis, a second axially aligned spur gear rotatable therewith which in turn drives a spur gear rotatably mounted in a casing containing both spur gears, said last named spur gear directly driving through a shaft a steering gear in the steering box.

4. Reversible steering mechanism as claimed in claim 1 in which the reversible gearing comprises a pair of opposed bevel gears connected by a third bevel gear and said disconnecting means comprising a dog clutch adapted by adjustment to connect the steering shraft with either of the opposed bevels to produce drives of opposite senses or to a neutral position to disconnect the driving shaft from either bevel.

5. Reversible steering mechanism as claimed in claim 1 in which the drive from the steering shaft to the rotatable member includes a spur gear splined to the steering shaft, an idler gear transmitting drive from the said spur gear to a driven spur gear rigidly connected to the rotatable member and mounted for rotation about the said vertical axis.

6. Reversible steering mechanism as claimed in claim 1 in which the driving seat and steering column are mounted upon a member rotatably carried about the said vertical axis, said seat being moveable towards and away from the said vertical axis.

7. Reversible steering mechanism for wheeled vehicles comprising a steering shaft and a driving seat mounted oppositely to one another and in fixed angular relationship about a vertical axis about which they are adapted to be rotated as a single unit; a member rotatable about the said vertical axis and in driving engagement with said steering shaft; means mounted upon the vehicle adapted to steer the vehicle wheels; said member being in operative engagement with said means; reversible gearing disposed between the steering shaft and the rotatable member; means for disconnecting the drive from the steering shaft to the rotatable member; and planetary steering mechanism operated by said rotatable member and rotable about the said vertical axis and operating an output lever which comprises said first mentioned means and which is connected by linkages to the steered wheels of the vehicle.

8. Reversible steering mechanism as claimed in claim 7 in which the planetary steering mechanism includes an eccentric and comprises a planet pinion eccentrically mounted for rotation about said eccentric and about the said vertical axis by the rotatable member, said planet pinion engaging over part of their peripheries a fixed annulus gear and a rotatable annulus gear concentrically mounted about said vertical axis, said rotatable annulus gear being driven by said planet pinion, and said output lever being carried by said rotatable annulus gear and connected to the steered wheels of the vehicle.

References Cited by the Examiner

UNITED STATES PATENTS 1,588,395   6/26   Winn _____ 280—91 X
2,366,122   12/44  Merce _____ 280—91 X

FOREIGN PATENTS 1,057,583   10/53  France.

BENJAMIN HERSH, *Primary Examiner.*

A. HARRY LEVY, MILTON BUCHLER, *Examiners.*